Patented May 28, 1946

2,401,102

UNITED STATES PATENT OFFICE 2,401,102

RESINOUS CONDENSATION PRODUCTS AND MOLDING COMPOSITIONS PRODUCED THEREFROM

Frederick James William Popham, New Barnet, England, assignor to The British Rubber Producers' Research Association, London, England No Drawing. Application June 19, 1943, Serial No. 491,561. In Great Britain October 28, 1942

2 Claims. (Cl. 260—768)

This invention relates to synthetic resinous condensation products and molding compositions produced therefrom, with more especial reference to the preparation of phenol formaldehyde resins modified by the incorporation of oxidised rubber to impart residual thermo-plasticity to the products derived therefrom.

In the specification of co-pending application Serial No. 466,673 there is described a process for preparing synthetic resins which consists in intimately mixing oxidised rubber prepared according to the methods disclosed in British Patent Specifications 417,912, 462,613 or United States Patent No. 2,132,809, with maleic anhydride and a phenol, heating the mixture in the presence of air or oxygen, and then reacting the mixture with formaldehyde while preventing undue rise in temperature.

Moreover, in co-pending application Serial No. 469,571 a single stage process is described wherein the maleic anhydride is replaced by an acid catalyst such as oxalic acid, formic acid and/or maleic acid and wherein, it is believed, the oxidised rubber simultaneously reacts with the phenol and with the formaldehyde on heating the mixture to precipitate the resin.

It has now been found that the reaction can be carried out using a basic catalyst such as caustic soda, caustic potash or ammonia and that the resins obtained are insoluble in the usual solvents.

Further, the resins possess residual thermoplasticity after heating and readily wet asbestos fibre thus finding a useful application in the manufacture of brake linings.

Ammonia is the preferred catalyst, and, in the practice of the invention according to one example, 200 parts by weight of oxidised rubber are mixed with 1000 parts of cresol (40% meta cresol), 1000 parts of formaldehyde (40%) and 25 parts of .890 ammonia solution, the mixture being heated at 95° C. under reflux for two hours or until the resin forms, and the resin being then dehydrated under vacuum or in other appropriate manner.

The product is insoluble in benzole which implies that combination has taken place and that the plasticity of the final product is not due to an ordinary plasticising action, and is similar in behaviour to one-stage resins, the usual molding practice in regard to which may be followed for the manufacture of finished goods.

The oxidised rubber employed for the process may be, or may include a proportion of, reclaim or rubber preliminarily oxidised as described in co-pending application Serial No. 469,571.

What I claim is:

1. A process for the preparation of synthetic resinous products insoluble in benzole from phenol, formaldehyde and oxidised rubber consisting in intimately mixing and dissolving oxidised rubber in a mixture of a phenol, formaldehyde in which there is an equi-molecular proportion of formaldehyde to phenol and adding to said mixture a basic catalyst (caustic soda, caustic potash or ammonia) and heating the mixture to approximately 95° C. to precipitate the resin from said mixture.

2. A process for the preparation of a synthetic resin product insoluble in benzol from phenol, formaldehyde and oxidised rubber wherein said oxidised rubber in the proportions of about 200 parts by weight of oxidised rubber is mixed with and dissolved in 1000 parts of cresol (40% meta cresol), 1000 parts formaldehyde (40%) and 25 parts of .890 ammonia solution, the mixture being heated at 95° C. under reflux for two hours to thereby precipitate the resin formed and subsequently dehydrate said resin.

FREDERICK JAMES WILLIAM POPHAM.